Feb. 8, 1955
A. J. RAMEY
2,701,557
ATOMIZING AND MIXING DEVICE FOR
INTERNAL-COMBUSTION ENGINES
Filed Nov. 24, 1950
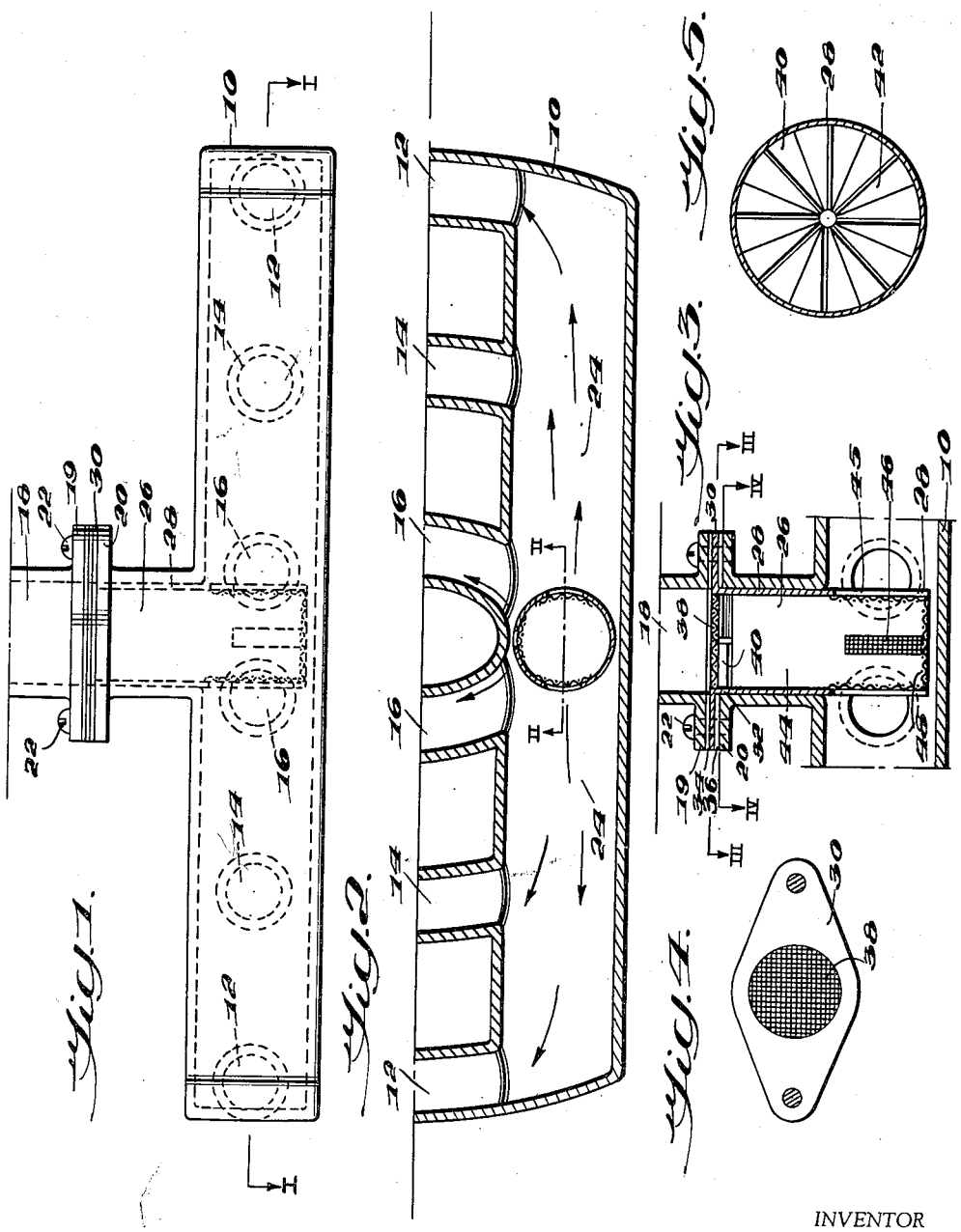
INVENTOR
AXIUER J. RAMEY,
BY Robert B. Larson
ATTORNEY

United States Patent Office 2,701,557
Patented Feb. 8, 1955

2,701,557

ATOMIZING AND MIXING DEVICE FOR INTERNAL-COMBUSTION ENGINES

Axiuer J. Ramey, Corona, Calif.

Application November 24, 1950, Serial No. 197,320

7 Claims. (Cl. 123—141)

This invention relates to mixing devices for automotive and other types of internal combustion engines, and more specifically to improvements in gas refiners for securing better atomization, homogenization, and more efficient combustion of gasoline and like fuels. This invention is particularly adapted, but not limited in application, for use with in-line, in-parallel, and radial internal combustion engines, provided with any number of cylinders.

Numerous fuel saving devices have been provided for internal combustion engines in order to provide for a better mixing of the gasoline and air prior to the mixture passing into the intake manifold for delivery to the firing chambers. These prior art devices are generally located between the outlet of the carburetor and the inlet of the intake manifold to the engine.

One of the most recent of these devices utilizes a fan which has a tendency partially to break up the flow of the gas and air current from the carburetor and thus produce a better mixture of the fuel and the combustion agent. The swirling elements are then passed through a screen net that atomizes and more intimately mixes the mixture.

Another one of these devices comprises a cylindrical member or mixer which is located in the intake manifold and which is provided with a plurality or series of vanes within the cylinder which impart a swirling motion to the mixture of air and fuel so as to more intimately mix the two together.

Still another arrangement for accomplishing a better atomization of the fuel consists in providing a mixer between the carburetor and the intake manifold which consists of a series of parallel screens located in a transverse direction to the flow of the fuel and air mixture. These screens, in addition to screening the mixture, serve to break up the globules of fuel into smaller particles and caused a commingling of the fuel and air so that a more uniform mixture is obtained.

All of the prior art mixing devices have a general tendency to break up the gaseous fuel particles from the carburetor into smaller portions that are more intimately mixed with the combustion agent, but none appear to break up the gasoline globules and inter-mix them with the air to such a degree that practically perfect and complete combustion is obtained without loss of any of the fuel.

It is an object of this invention, therefore, to provide a gas refiner that will cause a high degree of atomization of gasoline fuel and the like and which will mix the fuel with a combustion agent such that substantially complete combustion is obtained without loss of fuel. To provide a gas refining device that will enable the engine to produce a substantial increase in power as well as to increase the number of miles of operation obtained per gallon of gasoline or fuel used, is another object of this invention.

Even still another object of this invention is to provide a gas refiner that will give a more complete and homogeneous mixture of the combustion fuel and combustion agent after these agents have passed out of the carburetor but before passing into the intake manifold of the engine, than can be obtained with prior art mixing devices.

Another object of this invention is to provide a gas refiner that can be utilized without any major changes in the ordinary construction of any of the automotive or internal engine parts, and which can be used with either in-line, in-parallel, or radial engines, having a single or plurality of firing cylinders.

Still even a further object of this invention is to provide a new design of gas refiner that can be economically manufactured, which is efficient and reliable in operation, and finally which can be easily and rapidly installed, maintained and replaced.

In its essence, this invention pertains to a gas refiner that is mounted between the outlet of the carburetor and the intake manifold of the engine construction. It comprises a cylindrical housing having two wire screens located at the inlet and outlet thereof, fixed bladed spreader adjacent to and below the inlet screen, and a plurality of manifold screens located in the longitudinal walls of the gas refiner housing at its lower portion and in the areas of flow to the various cylinders. It is the function of the intake and manifold screens to break down and atomize the large globules of gas that pass thereto from the carburetor.

These and other objects affected by this invention as will be apparent from the following description and claims taken in connection with the accompanying drawings, forming a part of this application, in which:

Fig. 1 is an elevation view of an engine manifold showing the mounting of the gas refiner between the engine manifold and the carburetor;

Fig. 2 is a horizontal sectional view taken along line I—I of the arrangement shown in Fig. 1 and looking in the direction of the arrows;

Fig. 3 is a vertical sectional view of a preferred embodiment of the invention taken along line II—II of the arrangement shown in Fig. 2 and looking in the direction of the arrows;

Fig. 4 is an enlarged horizontal sectional view of refiner flange member taken along line III—III of Fig. 3 and looking in the direction of the arrows;

Fig. 5 is an enlarged horizontal sectional view of the bladed spreader taken along line IV—IV of Fig. 3 and looking in the direction of the arrows.

The gas refiner attachment which comprises my invention is shown in the drawings in a preferred embodiment, although it is to be understood that departures from the construction shown in the drawings can be made without departing from my inventive concept. In the present embodiment of my invention, reference numeral 10 refers generally to an internal combustion engine having six operating cylinders. These cylinders are located three each on either side of the main transverse axis of the engine. They are arranged in symmetrical pairs, namely, furthermost, intermediate, and nearmost cylinders, and are designated by numerals 12, 14, and 16, respectively.

A carburetor, shown only partially at 18 in Fig. 1, has its base flange portion 19 secured to engine flange portion 20 by means of screws or bolts 22. Between engine intake manifold 24 and carburetor 18, I have located my unique gas refiner, which is designated generally by numeral 26.

My gas refiner comprises a cylindrical housing 28 having an outwardly extending periphery flange 30 at its upper and support end 32. Periphery flange 30 is well illustrated in Fig. 4. Flange portion 30 has the same general shape as carburetor and engine flange portions 19 and 20, respectively, and is located between these two flanges. A gasket 34, of the same configuration as flange portion 30, is located between the carburetor and gas refiner flanges 19 and 30, respectively. Likewise, another gasket 36, also of the same configuration as gasket 34, is placed between the gas refiner flange 30 and the engine flange portion 20. The carburetor 18, gas refiner 26, as well as the gaskets 34 and 36 are maintained in position by means of the screws or bolts 22.

At the upper end 32 of housing 28, there is located an intake screen 38. This screen extends transversely to the longitudinal axis of housing 28, and, at the same time, encloses the upper end 32 of the housing 28. Intake screen 38 is composed of a fine mesh wire, and it has for its function the breaking up of the gas particles reaching it from the carburetor. This intake screen causes an atomization of approximately 50 percent. It has been found, for best atomization, that this screen should be of 60 mesh wire.

Directly below the intake screen is located a fixed-bladed spreader 40. This spreader is composed of a plurality of blades 42, which can be stamped out of a circular disc metal sheet. These blades are equally spaced about the housing 28, and they have a pitch angle to the longitudinal axis of the housing 28 and the direction of flow of the liquid gas medium from the carburetor 18. For the most optimum working conditions, it has been found experimentally that the number of blades should not exceed or be less than eight. The outer ends of the blades are welded to housing 28. It is the chief purpose of the spreader to give a swirling action to the gasoline fuel and combustion agent as they pass through the blades 42 into the chamber 44 located therebelow. By means of the swirling action caused by the spreader, the gasoline fuel and combustion agent are more effectively and intimately mixed so as to form a cloudy mixture. In the design of the spreader, it was found essential, for most economical operation of the engine and efficient action of mixing the gasoline fuel and combustion agent, to have the pitch of the blades at a 45° angle. At angles of less magnitude, it was found that the motor would become choked and that the gas would not be distributed in a gaseous cloud after it passed into the housing chamber 44. When the blade pitch is greater than 45°, there appears to be less swirling and spreading action, with a consequent loss of power, and a material reduction in mileage and the like.

At the lower portion of housing 28, there are located three manifold screens, two of which are identical with each other, while the other is of smaller area. These screens are located in the cylindrical wall of the housing 18 and are integral therewith. The lower edges of manifold screens 45 extend to the lower periphery of housing 28, and they extend substantially transversely to the intake manifold 24 to the engine cylinders 12 and 14. The other manifold screen 46 is also integral with the housing and identical to the other two screens 45 in height, but it has a width of only one-half of the individual widths of screens 45. Screen 46 extends in a direction substantially transverse to screens 45 and parallel to the longitudinal axis of the intake manifold 24. These manifold screens are composed of the same fine mesh wire as used for the intake screen 38, and serve to give an atomization of approximately 50 percent of the gaseous mixture from chamber 44. A discharge screen 48, of much finer mesh, preferably 100 mesh wire, is located at the lower end of housing 28 and completely encloses the end thereof. This screen was located at the bottom of the housing in order to prevent choking of the engine.

In a general manner, while I have described what I deem to be the practical and efficient embodiment of my invention, it should be well understood that I do not wish to be limited thereto as there might be changes made in the arrangement, disposition and form of the parts without departing from the principle of the present invention as comprehended within the scope of the accompanying claims.

I claim:

1. A gasoline atomizing and mixing arrangement for use with an internal combustion engine, an intake manifold, and a carburetor therefor, comprising, a housing to be secured between said carburetor and said intake manifold and to extend into said intake manifold to form the only passage for entry of the fuel into said manifold, a screen covering an inlet opening formed in said housing for partially atomizing said liquid fuel, a bladed element disposed adjacent said inlet screen and having its blades extending from the center of said housing to the walls thereof to form a restricted passage for imparting a swirling motion to the fuel, a portion of said housing forming a mixing chamber between said bladed member and the lower end of said housing wherein the fuel and its mixing agent are swirled and homogenized to form a cloudy mixture, and screens disposed over openings formed in the lower wall of said housing for completing the atomization of said fuel mixture.

2. A gasoline atomizing and mixing arrangement for use with an internal combustion engine having at least three cylinders in line with each other, an intake manifold, and a carburetor located centrally of said line of cylinders comprising, a housing to be secured between said carburetor and said intake manifold and to extend into said intake manifold to form the only passage for entry of the fuel into said manifold, a screen covering an inlet opening formed in said housing for partially atomizing said liquid fuel, a bladed element disposed adjacent said inlet screen and having its blades extending from the center of said housing to the walls thereof to form a restricted passage for imparting a swirling motion to the fuel, a portion of said housing forming a mixing chamber between said bladed member and the lower end of said housing wherein the fuel and its mixing agent are swirled and homogenized to form a cloudy mixture, means forming a central opening and two oppositely disposed side openings in the longitudinal wall of said housing, adjacent the lower end thereof, said central opening facing the branches of said manifold leading to the central cylinders, and said side opening facing the manifold branches leading to the more remote cylinders, and screens covering said openings for completing the atomization of the fuel mixture.

3. An arrangement according to claim 2, in which said central opening is approximately one-half the area of said side openings.

4. An arrangement according to claim 1 in which said screens are 60 mesh.

5. An arrangement according to claim 4, and a 100 mesh screen covering an opening formed in the bottom of said housing to reduce choking of the engine.

6. An arrangement according to claim 1 in which said bladed member comprises eight equally spaced blades having a pitch angle of approximately 45°.

7. A gasoline atomizing and mixing arrangement comprising, a housing, a screen covering an opening formed in the inlet end of said housing for partially atomizing said gas, a bladed element fixedly mounted adjacent said inlet screen and having its blades extending from the center of said housing to the walls thereof to form a restricted passage for imparting a swirling motion to said partially atomized gas, a portion of said housing forming a mixing chamber between said bladed member and the lower end of said housing wherein the fuel and its mixing agent are swirled and homogenized to form a cloudy mixture, means forming a central opening and two oppositely disposed side openings in the wall of said housing at its outlet end, said central opening being approximately one-half the area of said side openings, and screens covering said openings for completing the atomization of the fuel mixture.

References Cited in the file of this patent

UNITED STATES PATENTS

| | | |
|---|---|---|
| 1,061,655 | Bachman | May 13, 1913 |
| 1,074,136 | Parker | Sept. 30, 1913 |
| 1,474,540 | McNulty | Nov. 20, 1923 |
| 2,273,957 | Harrell | Feb. 24, 1942 |